United States Patent [19]
Sevak et al.

[11] 3,961,784
[45] June 8, 1976

[54] DOCUMENT TRANSPORT APPARATUS HAVING A VACUUM ASSISTED FRICTION FEEDER

[75] Inventors: Nitin M. Sevak, Westland; Chauchang Su, West Bloomfield Township, both of Mich.

[73] Assignee: Burroughs Corporation, Detroit, Mich.

[22] Filed: Mar. 3, 1975

[21] Appl. No.: 554,660

[52] U.S. Cl. ................................. 271/94; 271/34; 271/104; 271/112; 271/122
[51] Int. Cl.² ............................................ B65H 3/12
[58] Field of Search ................. 271/30 R, 30 A, 34, 271/35, 94, 99, 104, 112, 122, 126

[56] References Cited
UNITED STATES PATENTS

| 822,661 | 6/1906 | Eschenbach | 271/35 |
|---|---|---|---|
| 3,131,929 | 5/1964 | Rehm | 271/94 |
| 3,171,647 | 3/1965 | Bishop | 271/94 |
| 3,260,520 | 7/1966 | Sugden | 271/35 |

FOREIGN PATENTS OR APPLICATIONS

| 1,236,531 | 3/1967 | Germany | 271/94 |

*Primary Examiner*—Evon C. Blunk
*Assistant Examiner*—Robert Saifer
*Attorney, Agent, or Firm*—Edwin W. Uren; Kevin R. Peterson

[57] ABSTRACT

Document transport apparatus in a document reader sorter is provided with a vacuum assisted friction feeder for picking documents one at a time from a document hopper and for advancing the documents at high speed along a document transport guideway to the control of a transport burst roller, the picking of the documents from the hopper by an apertured friction feed belt being assisted and facilitated by a low pressure vacuum directed upon a linearly disposed section thereof adjacent the hopper, and the high speed advancement of the documents into and along the document guideway to the control of the transport burst roller being assisted and facilitated by a high pressure vacuum directed upon a curvilinear section of the apertured belt cooperably disposed relative to the apertured circumference of a drive pulley, said high pressure vacuum being effective to lock the picked documents and particularly the leading edges thereof to the feed belt for an accelerated feeding thereof, said accelerated feeding of the documents into the document transport guideway in combination with the accelerated transmission of the documents therein by the transport burst roller resulting in maximized document throughput for the document reader sorter.

22 Claims, 7 Drawing Figures

DOCUMENT TRANSPORT APPARATUS HAVING A VACUUM ASSISTED FRICTION FEEDER

BACKGROUND OF THE INVENTION

Prominent among the automatic data processing equipment normally used in banking institutions and the like is the document reader sorter which provides for the automatic machine reading of data recorded on documents such as bank checks, and for the automatic sorting of the documents into a plurality of document pockets, quantities of the documents being manually placed in a document hopper from which they are individually fed at high speed along a document transport guideway past a read station to a selected one of the plurality of pockets. The machine reading of the data recorded on the individual documents is accomplished by means of one or more MICR or OCR read heads disposed at the read station, and sorting of the documents is generally accomplished automatically as a by-product of the machine reading function, data encoded in a given field on the face of the document being readably interpreted to select the particular pockets into which the documents are to be sorted.

The operation of a typical document reader sorter in which MICR encoded checks are automatically processed may be described with reference to FIG. 1. In such reader sorters, the encoded checks containing ferromagnetic indicia are placed in a hopper compartment generally designated at 3 and individually fed by a driven belt 5 into a guideway 7 to the control of a driven burst roller 9, the driven burst roller serving to activate the individual checks at high speed along a guideway 11 to the control of a driven transport drum 13, the transport drum 13 activating the individual checks through a read station and along a guideway 15 to a plurality of selectable pockets generally designated at 17. A plurality of motors 18 are utilized for rotating the belt 5, the burst roller 9 and the transport drum 13. Rotatable rollers 19 are disposed along the guideways 7, 11 and 15 to provide free movement of the checks therealong, and a plurality of Beam-o-Lights 21 are disposed along the guideways to provide effective monitoring of check movement and to shut the apparatus down should the free flow of checks be interrupted. As the individual checks are transported around the transport drum 13, the ferromagnetic indicia encoded thereon is magnetized by a magnetizing head 23, and the magnetized indicia read by a read head 25, such magnetizing and reading being accomplished as the individual checks are transported at high speed around the transport drum 13 and into the guideway 15.

The hopper compartment 3 in document reader sorters of this type is generally provided with a pressure flag 27 effective for urging the documents in the hopper, and particularly the leading document therein, into frictional contact with the feed belt 5. The feed belt 5 is typically made of cork and is disposed around a driven feed pulley 29 having a rubber tire (not shown) disposed around its periphery, and a spring-loaded idler pulley 31, the cork belt and rubber tire of the feed pulley providing a coefficient of friction considerably greater than the coefficient of friction as between the documents themselves and between the documents and a driven separator belt that is not shown in FIG. 1 but generally disposed in the area designated 33 in the drawing.

Although document feeders such as that illustrated in FIG. 1 and briefly described supra have proven effective for feeding documents at a speed of from 150 to 200 inches per second, and for achieving a document throughput for the reader sorter of from 1,500 to 2,000 6-inch documents per minute, they have been found to be relatively unreliable when used in reader sorters where a feeding speed of from 300 to 600 inches per second is required to maintain a document throughput of from 3,000 to 5,000 documents per minute, such increased document throughput being regarded as essential goals in the development of future generation document reader sorters. Of particular concern in the use of such known document feeders in higher speed reader sorters is the susceptibility of the cork belt 5 and the rubber-tired feed pulley 29 to experience excessive wear, particularly when subjected to the force that has heretofore been applied by the pressure flag 27, the occurrence of wear in the rubber tire resulting in undesirable slippage in document feeding.

SUMMARY OF THE INVENTION

It is accordingly an important object of the present invention to provide a document feeder that will operate reliably and uniformly at speeds of from 300 to 600 inches per second, to thereby accommodate a reader sorter throughput rate of from 3,000 to 5,000 documents per minute.

It is another object of the present invention to provide a document feeder wherein wear due to usage may be minimized, and wherein friction as between the documents and various of the feeder parts is minimized.

It is still another important object of the present invention to provide a document hopper and feeder wherein the force applied by the pressure flag to the documents in the hopper is significantly reduced, and wherein the resulting tendency toward wear of the belt and the feed pulley is minimized.

An important aspect of the present invention is the use in a document feeder of an apertured friction feed belt and an apertured feed pulley for pickably feeding documents from a hopper into a document transport guideway, a vacuum chamber being stationarily disposed within the feed to apply a low pressure vacuum to a linear section thereof adjacent the hopper, and a vacuum shoe being stationarily disposed interiorly of the outer circumference of the feed pulley to apply a high pressure vacuum to arcuate sections of the pulley and belt defining the entranceway to the document transport guideway.

BRIEF DESCRIPTION OF THE DRAWING

These and other objects, aspects and advantages of the invention will become more readily apparent from the following description when read in conjunction with the accompanying drawing figures, in which.

DESCRIPTION OF THE PREFERRED EMBODIMENT

The invention hereinafter described resides in the provision of vacuum assisted friction feed apparatus for use in document handling and processing equipment such as document reader sorters, such apparatus being effective for feeding documents one at a time and at high speed from a hopper compartment into a document transport guideway, the handling and processing equipment providing also means for transporting documents at high speed past a processing station and into selected ones of a plurality of sorting pockets, the speed of feeding the documents from the hopper into the document transport guideway being effective for accommodating a document throughput for the processing equipment of from 3,000 to 5,000 documents per minute.

Figure 1:
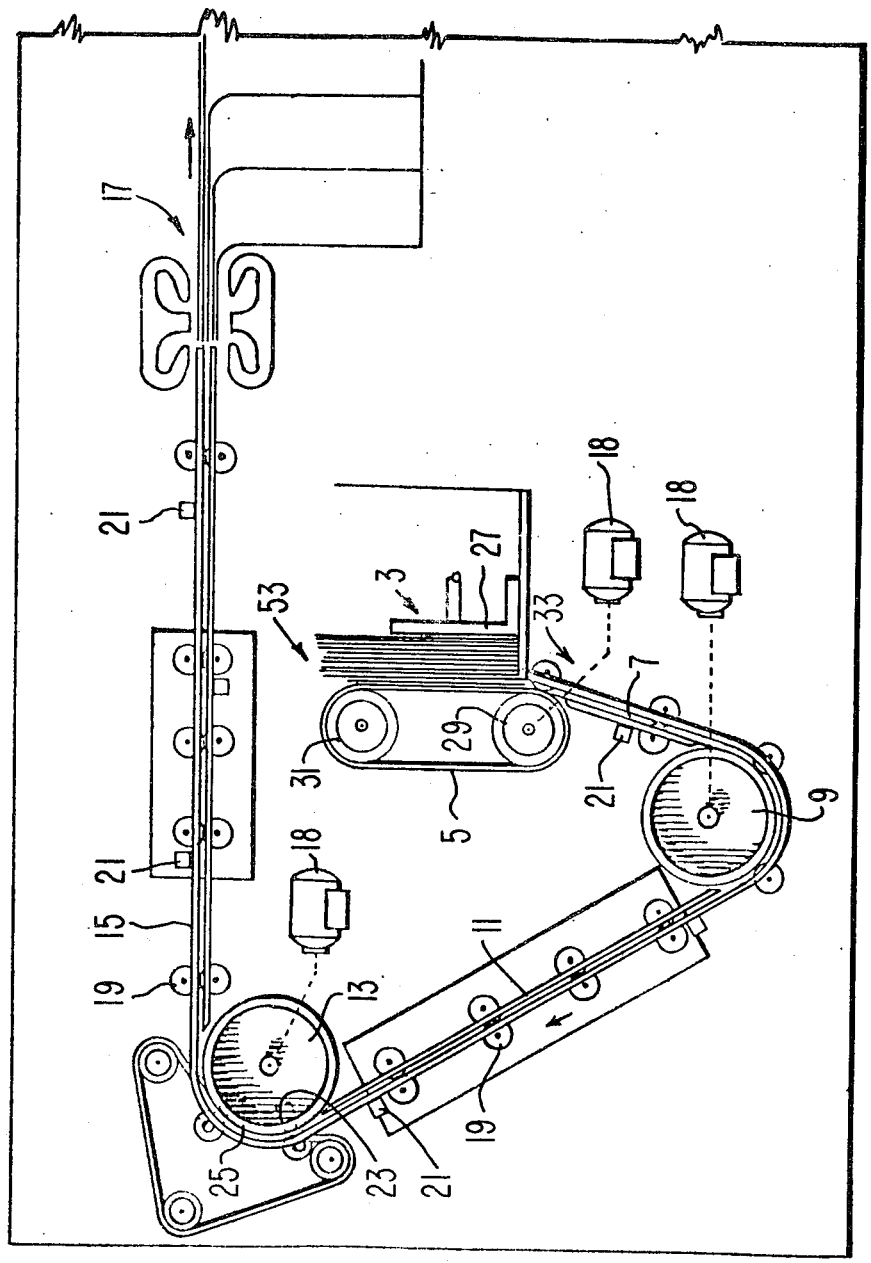
FIG. 1 is a plan view of a typical prior art document reader sorter including a document hopper and friction feed means for pickably feeding documents one at a time from the hopper to the document transport guideway thereof.
Figure 2:
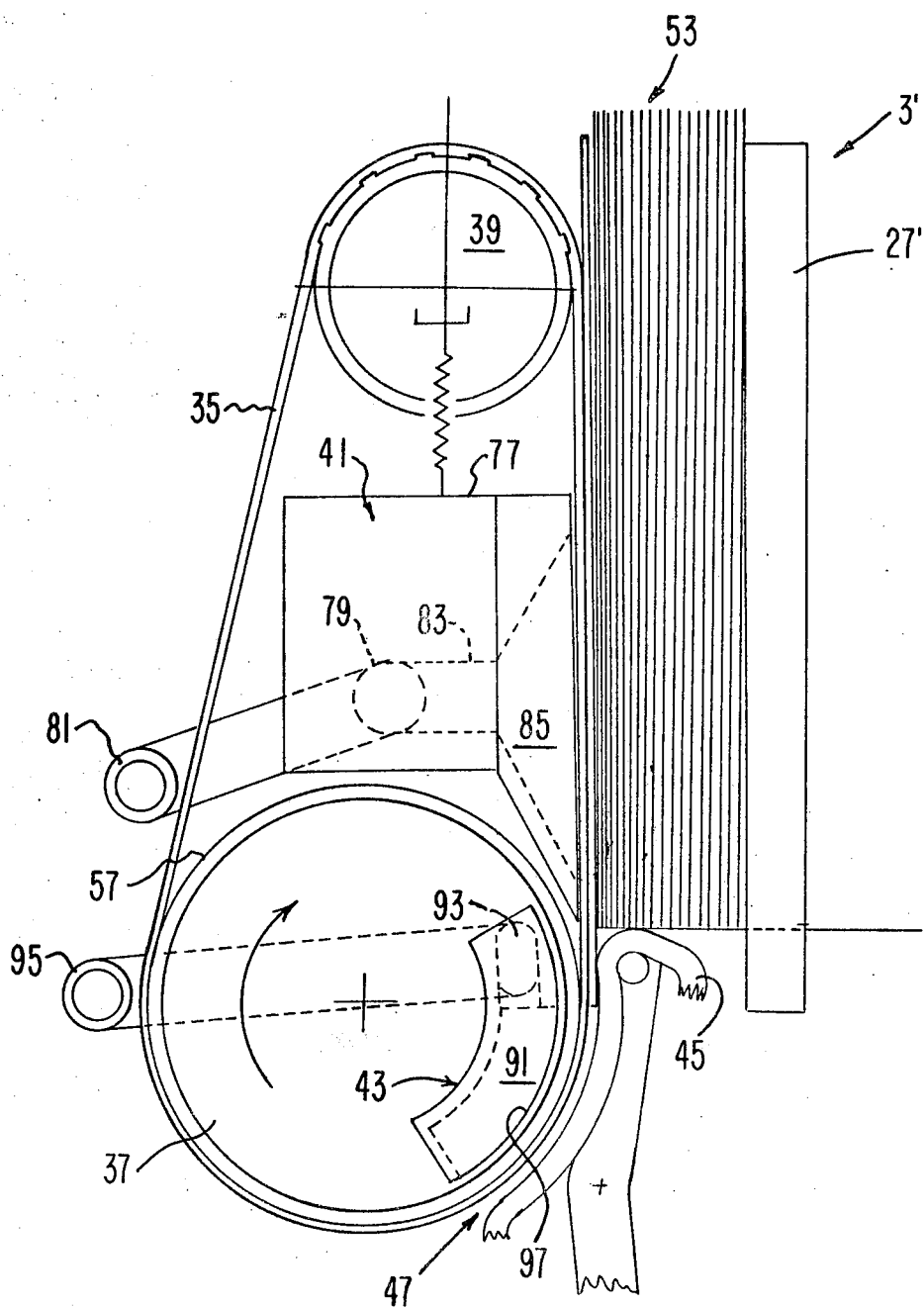
FIG. 2 is a diagrammatic illustration showing the various components of the inventive vacuum assisted friction feeder.

The inventive vacuum assisted friction feed apparatus, as diagrammatically illustrated in FIG. 2, is comprised of a hopper compartment 3' containing a pressure flag 27', a flat apertured belt 35 rotatably disposed about an apertured drive pulley 37 and a spring loaded idler pulley 39, a low pressure vacuum chamber 41 coplanarly disposed relative to the belt 35 and coplanarly and intermediately disposed relative to the pulleys 37 and 39, a high pressure vacuum shoe 43 stationarily disposed interiorly of the outer circumference of the apertured drive pulley 37, and a separator belt 45 disposed in cooperating relationship relative to an arcuate portion of the drive pulley 37 to define an entranceway 47 to the document transport guideway illustrated in FIG. 1 at 7, 11 and 15.

Figure 3:
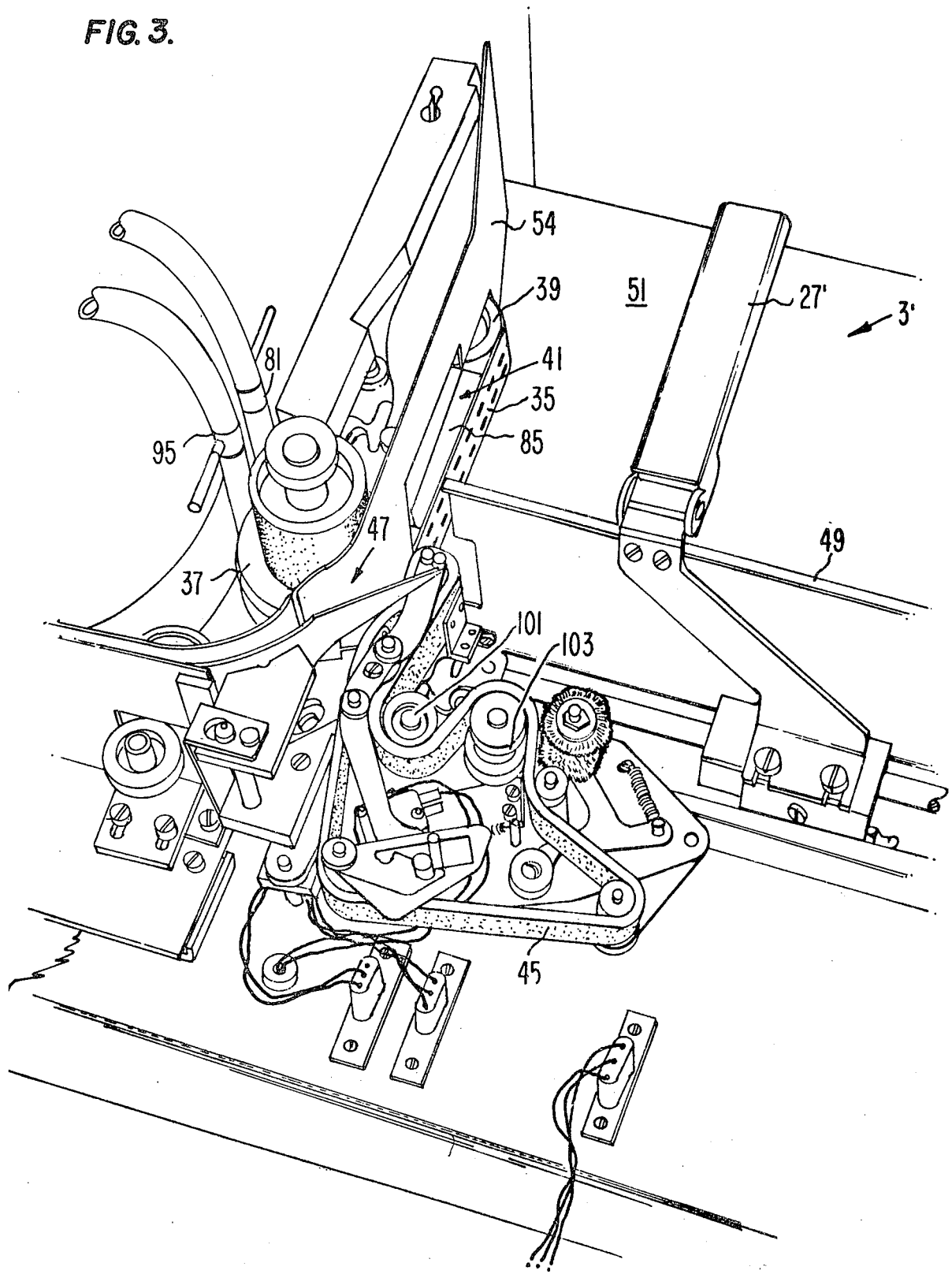
FIG. 3 is a detailed perspective view of the hopper compartment of a document reader sorter equipped with the inventive vacuum assisted friction feeder.
Figure 4:
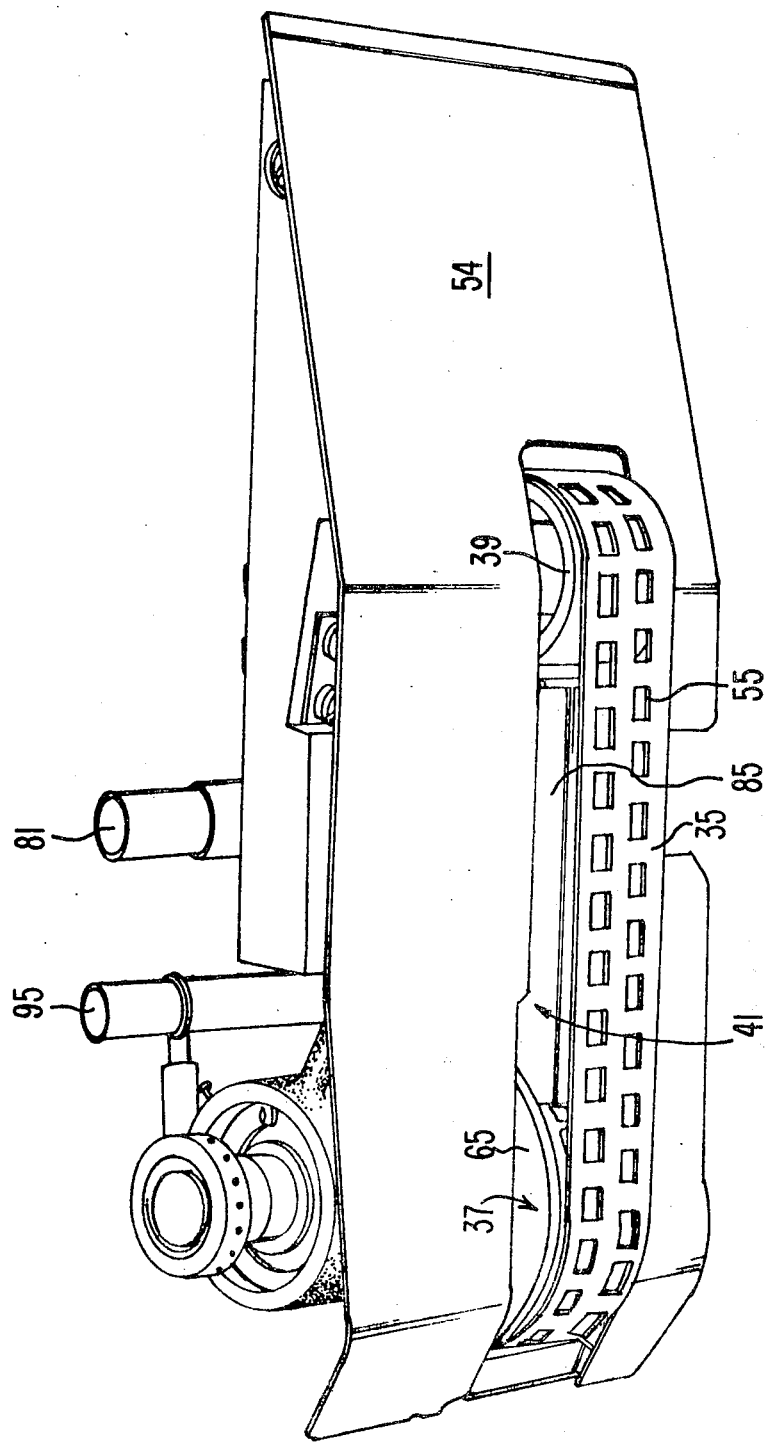
FIG. 4 is a perspective elevational view of the vacuum assisted friction feeder showing the apertured belt, the apertured drive pulley and the spring-loaded idler pulley thereof.

The hopper compartment 3', as best illustrated in FIG. 3, is comprised of a front edge guide 49 and a base portion 51, for guidably supporting a quantity of edge stacked documents as illustrated at 53 in FIGS. 1 and 2, and the pressure flag 27' which is mechanically loaded to apply a nominal force of from 150–200 grams to the document stack and to thereby urge the leading document in the stack into frictional contact with the apertured belt 35, the latter extending into the hopper compartment 3' through an aperture formed in a shield 54 defining the downstream foundary of the hopper compartment. The flat apertured belt 35 is provided with two rows of rectilinear apertures 55, as best illustrated in FIGS. 4 and 7, and may be made of any suitable material such as neoprene-backed dacron polyester having a coefficient of friction relative to the documents of approximately 1.0.

Figure 5:
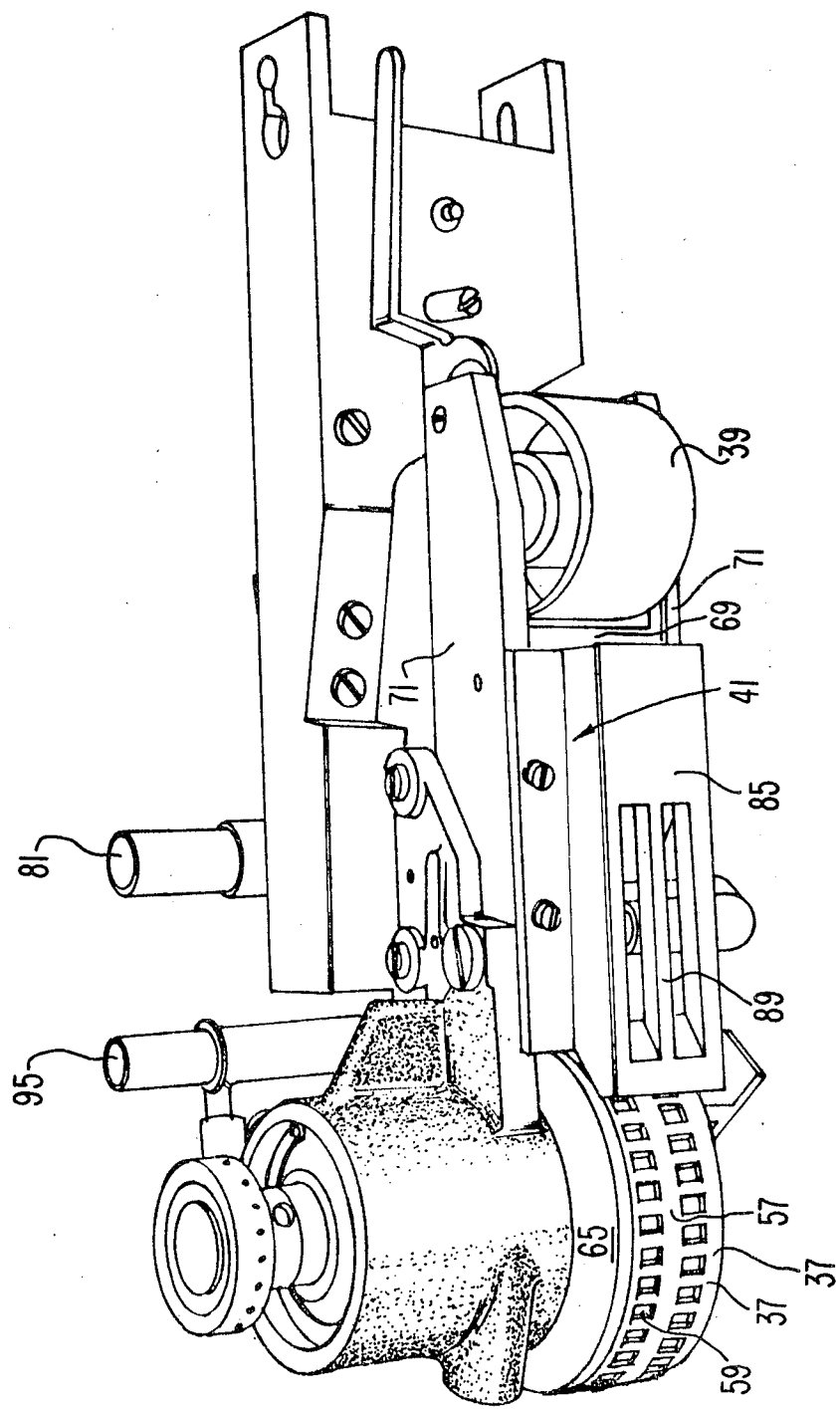
FIG. 5 is a perspective view similar to FIG. 4 but with the leading edge guide of the hopper and the apertured belt removed therefrom.
Figure 6:
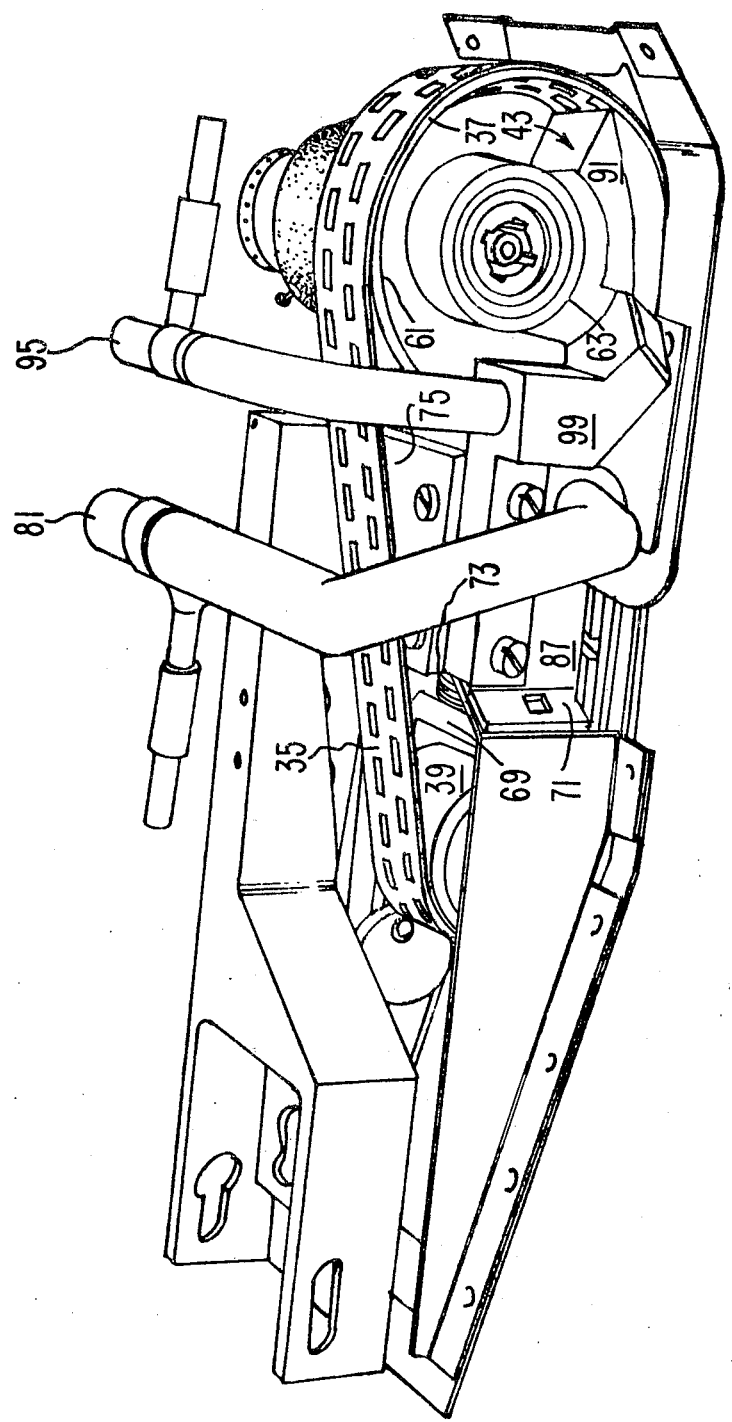
FIG. 6 is a bottom view of the inventive feeder assembly showing the biased slidable mounting of the idler pulley, the cup-like interior of the apertured drive pulley, and rigid tubing coupled to the two vacuum chambers thereof.
Figure 7:
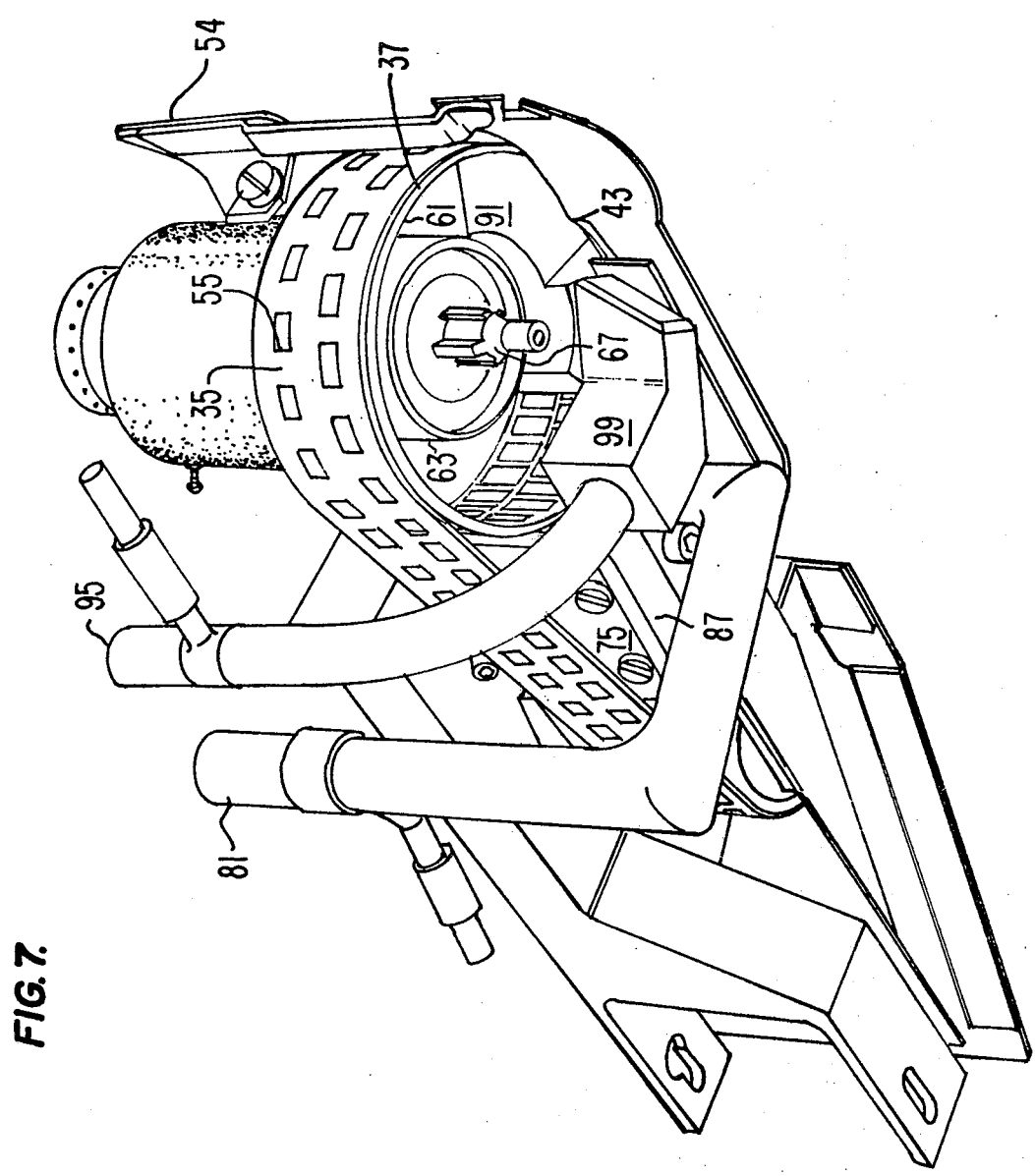
FIG. 7 is a perspective view of the bottom side of the feeder assembly showing the cup-like interior and hub portions of the drive pulley and a keyed connecting shaft for coupling the hub portion to drive means of the document reader sorter.

The drive pulley 37 is provided with a drum-like exterior circumference 57 having two rows of equally spaced apart apertures 59 formed therein, as best illustrated in FIG. 5, and provided also with an upper web member 65 (FIGS. 4 and 5) and an open-ended cup-like interior 61 (FIGS. 6 and 7) that is centrally traversed by an elongated hub portion 63, the hub portion 63 being drivably couplable with drive means of the document handling and processing equipment such as by means of a keyed connecting shaft or rod 67 (FIG. 7).

The idler pulley 39 is rotatably mounted by means of a bifurcated slidable bracket 69 translatably disposed in the grooves of a pair of grooved first frame members 71, as best illustrated in FIGS. 5 and 6, the bracket 69 and idler pulley 39 being biased in a direction opposite the drive pulley 37 by means of a compression spring 73 (FIG. 6) anchorably abutting against a cross member of the bifurcated bracket 69 and a second frame member 75, to thereby operatively retain the apertured belt 35 in encompassing relationship relative to the drive pulley 37 and idler pulley 39.

The low pressure vacuum chamber 41, which is diagrammatically illustrated in FIG. 2 as comprising an outer housing 77, an inlet aperture approximately two coupled with a first rigid tubular member 81, and an inner passageway 83 leading from the inlet aperture 79 to an outlet head 85, is also shown in FIG. 5 to be mounted on the pair of first frame members 71 intermediate the drive pulley 37 and the idler pulley 39, and shown in FIG. 6 to be mounted also on the second frame member 75 by a connecting plate 87 integrally formed with the first tubular member 81. The outlet head 85 of the low pressure chamber 41 is preferably designed to accommodate a flared pressure outlet of approximately two inches in exterior length, and provided with a central longitudinal rib 89 (FIG. 5) that will prevent buckling of the belt 35 into the flared outlet of the outlet head 85. The first rigid tubular member 81, as suggested by FIG. 3, is connected by flexible tubing to a low pressure vacuum source of any suitable type that is effective for producing a vacuum pressure of approximately ½ PSI, such negative pressure being applied by means of the first rigid tubular member 81, the inner passageway 83, and the outlet head 85 to the apertured belt 35 disposed within the hopper compartment 3', to thereby pickably lock the leading document in the hopper to the belt 35 to be advanced thereby into the entranceway 47 of the document transport guideway. In order to prevent leakage of the low pressure vacuum between the outlet head 85 and the edges of the apertured belt 35, it has been found desirable to fill the gap between the head 85 and the belt 35 with a teflon pad (not shown), such pad being fixed by any suitable adhesive material to the face of the head 85.

The high pressure vacuum shoe 43, which is diagrammatically illustrated in FIG. 2 as comprising an outer housing 91, an inlet aperture 93 coupled with a second rigid tubular member 95, and an elongated arcuate outlet head 97, is also shown in FIGS. 6 and 7 to be stationarily mounted relative to the drive pulley 37 and within the cup-like interior 61 thereof by means of a transmission member 99 integrally formed with both the second rigid tubular member 95 and the connecting plate 87, the plate 87, as indicated supra, being connected to the second frame member 75. The second rigid tubular member 95, as also suggested by FIG. 3, is connected by flexible tubing to a high pressure vacuum source that is effective for producing a vacuum pressure of approximately 2½ PSI, such negative pressure being applied by the second rigid tubular member 95, the high pressure vacuum shoe 43, and the arcuate outlet head 97 to the inner apertured circumference of the drive pulley 37, the apertures 59 of the drive pulley 37 and the apertures 55 of the belt 35 cooperably responding to the high pressure vacuum to lock the leading edge of a picked document to the apertured belt 35 and to thereby advance the document at high speed into and along the document transport guideway. The separator belt 45, which is diagrammatically illustrated in FIG. 2 to partly define the entranceway 47 to the document transport guideway, is shown in greater detail in FIG. 3. This belt 45 may be made of a material such as foam urethane and should provide a coefficient of friction with the documents that is greater than the coefficient of friction of the belt 35 with the documents. The separator belt 45 is rotated in a clockwise direction relative to the entranceway 47, such that documents that are inadvertently picked by the belt 35, along with the leading document in the hopper, will be returned to the hopper compartment 3'. The clockwise rotation of the separator belt 45 is accomplished by the counterclockwise rotation of a first drive roller 101 and the clockwise rotation of a second drive roller 103.

OPERATION

The operation of the document handling and processing equipment, with a quantity of edge stacked documents disposed within the hopper compartment 3' and between the pressure flag 27' and the downstream shield 54, involves the activation of the low and high pressure vacuum sources associated with the first and second rigid tubular members 81 and 95, respectively, the clockwise rotation of the apertured drive pulley 37 and second drive roller 103, and the counterclockwise rotation of the second drive roller 101. Activation of the low pressure source associated with the first rigid tubular member 81 results in the application of a low pressure vacuum to the apertured belt 35 in the area of the outlet head 85, to thereby lock the leading document in the hopper 3' against the apertured belt 35. Activation of the high pressure source associated with the second rigid tubular member 95 results in the application of a high pressure vacuum to the interior circumference of the apertured drive pulley 37 adjacent the separator belt 45. Rotation of the apertured drive pulley 37 and drive rollers 101 and 103, in either a feed demand or flow mode, results in the clockwise rotation of the apertured feed belt 35 and the separator belt 45. The clockwise rotation of the apertured belt 35, with the leading document in the hopper 3' locked thereagainst results in the pickable advancement of the leading document into the entranceway 47, the high pressure vacuum applied to the inner circumference of the apertured drive pulley 37 serving to receivably and securably lock the leading edge of the document against the area of the apertured belt 35 that is cooperably disposed relative to the apertured pulley 37 and vacuum shoe 43, to thereby pullably advance the document at high speed into the document transport guideway. The function of the separator belt 45, during the above described vacuum assisted friction feeding of single documents from the hopper compartment 3' into the document transport guideway, is to prevent the inadvertent feeding of more than one document at a time, the clockwise rotation of the separator belt 45 serving to return documents in excess of one to the hopper compartment 3'.

Although a preferred embodiment of the inventive vacuum assisted friction feed apparatus has been described in considerable detail, it will be apparent that various modifications and changes therein may be made by those skilled in the art without departing from the true spirit and scope of the invention as characterized by the appended claims.

What is claimed is:

1. In document reading and sorting apparatus having a document hopper for receiving a stack of documents to be readably and sortably processed, at least one document output stacker, guideway means communicating with said hopper and said stacker, a document read station disposed along said guideway means, and drive means for transporting documents along said guideway means and into said stacker, improved document feed means effective for picking documents one at a time from said hopper and for advancing said picked documents at high speed into said guideway means, said improved document feed means comprising:

a. a rotatably mounted apertured friction feed belt responsive to said drive means and cooperably disposed relative to the leading document of a said stack of documents received within said hopper, b. a biasing member disposed within said hopper and effective for contacting the trailing document of said stack of documents and for applying a nominal biasing force to said stack to thereby urge the leading document thereof into contact with said apertured friction feed belt, c. first vacuum means responsive to said drive means and effective for applying a vacuum pressure of a first order of magnitude to a linear section of said apertured belt disposed inboard of said hopper to thereby lock the leading document of said stack thereto, whereby upon the high speed rotation of said belt by said drive means documents are picked from said hopper and transported outwardly therefrom to an entranceway to said guideway means, and d. second vacuum means responsive to said drive means and effective for applying a vacuum pressure of a second order of magnitude to an arcuate section of said apertured belt disposed outboard of said hopper and contiguous to said entranceway to thereby lock the leading edges of said picked documents thereto such that said documents are pullably advanced at high speed from said entranceway into and along said guideway means.

2. The improved document feed means defined in claim 1 wherein said rotatable mounting of said apertured friction feed belt is accommodated by an apertured drive pulley and a spring-loaded idler pulley, said drive pulley being coupled to said drive means of said document reading and sorting apparatus at a point outboard of said hopper and contiguous to said entranceway of said guideway means, said idler pulley being rotatably mounted in spaced relationship with said drive pulley and at a point inboard of said hopper.

3. The improved document feed means defined in claim 2 wherein said friction feed belt and said drive pulley are provided with equally spaced apart apertures by means of which a leading document in said stack of documents in said hopper is locked against said linear section of said feed belt by the vacuum pressure applied by said first vacuum means thereagainst, and by means of which the leading edge of a said picked document is locked against said arcuate section of said feed belt by the vacuum pressure applied by said second vacuum means thereagainst.

4. The improved document feed means defined in claim 3 wherein said equally spaced apart apertures of said friction feed belt and said drive pulley are rectilinear in configuration.

5. The improved document feed means defined in claim 2 wherein said first vacuum means comprises:
   a. a first vacuum source responsive to said drive means and effective for generating a vacuum pressure of said first order of magnitude,
   b. a vacuum chamber mounted within said rotatably mounted apertured friction feed belt intermediate said apertured drive pulley and said spring-loaded idler pulley, said vacuum chamber having an inlet aperture, an outlet head disposed in communicating relationship with said linear section of said belt inboard of said hopper, and an inner passageway connecting said inlet aperture to said outlet head, and
   c. first tubular means connecting said first vacuum source to said inlet aperture of said vacuum chamber.

6. The improved document feed means defined in claim 5 wherein said second vacuum means comprises:
   a. a second vacuum source responsive to said drive means and effective for generating a vacuum pressure of said second order of magnitude,
   b. a vacuum shoe stationarily mounted within said apertured drive pulley, said vacuum shoe having an inlet aperture and an elongated arcuate outlet head leading away from said inlet aperture and communicating with the inner circumference of said drive pulley and with said arcuate section of said belt outboard of said hopper, and
   c. second tubular means connecting said second vacuum source to said inlet aperture of said vacuum shoe.

7. The improved document feed means defined in claim 6 wherein said apertured drive pulley is comprised of:
   a. an elongated hub portion by means of which said drive pulley is coupled to said drive means of said document reading and sorting apparatus,
   b. a web member fixed to said hub portion,
   c. a drum-like circumference depending from said web member and containing said equally spaced apart apertures of said drive pulley, and
   d. an open-ended cup-like interior defined by said drum-like circumference and centrally traversed by said elongated hub portion, said vacuum shoe of said second vacuum means being mounted for stationary positioning within said cup-like interior such that said elongated arcuate outlet head thereof is disposed in communicating relationship with said drum-like circumference containing said apertures.

8. The improved document feed means defined in claim 1 wherein said vacuum pressure of said second order of magnitude applied by said second vacuum means to said arcuate section of said apertured belt is greater than said vacuum pressure of said first order of magnitude applied by said first vacuum means to said linear section of said belt.

9. A vacuum assisted friction feeder for feeding documents one at a time and at high speed from a document hopper into a document transport guideway, said feeder comprising:
   a. actuating means associated with said feeder and with said hopper and transport guideway,
   b. a rotatably mounted apertured friction feed belt responsive to said actuating means and cooperably disposed relative to the leading document of a stack of documents received within said hopper,
   c. a biasing member disposed within said hopper and effective for contacting the trailing document of said stack of documents and for applying a nominal biasing force to said stack to thereby urge the leading document thereof into contact with said apertured friction feed belt,
   d. first vacuum means responsive to said actuating means and effective for applying a vacuum pressure of a first order of magnitude to a linear section of said apertured belt disposed inboard of said hopper, to thereby lock the leading document of said stack thereto, whereby upon rotation of said belt by said actuating means documents are picked from said hopper and started on their way to said document transport guideway, and
   d. second vacuum means responsive to said actuating means and effective for applying a vacuum pressure of a second order of magnitude to an arcuate section of said apertured belt disposed outboard of said hopper to thereby lock the leading edge of a said picked document thereto such that said document is pullably advanced at high speed into said document transport guideway.

10. The vacuum assisted friction feeder defined in claim 9 wherein said rotatable mounting of said apertured friction feed belt is accommodated by an apertured drive pulley and a spring-loaded idler pulley, said drive pulley being coupled to said actuating means at a point outboard of said hopper and contiguous to the entranceway of said transport guideway, said idler pulley being rotatably mounted in spaced relationship with said drive pulley and at a point inboard of said hopper.

11. The vacuum assisted friction feeder defined in claim 10 wherein said friction feed belt and said drive pulley are provided with equally spaced apart apertures by means of which the leading document in said stack of documents in said hopper is locked against said linear section of said feed belt by the vacuum pressure applied by said first vacuum means thereagainst, and by means of which the leading edge of a picked document is locked against said arcuate section of said feed belt by the vacuum pressure applied by said second vacuum means thereagainst.

12. The vacuum assisted friction feeder defined in claim 11 wherein said equally spaced apart apertures of said friction feed belt and said drive pulley are rectilinear in configuration.

13. The vacuum assisted friction feeder defined in claim 10 wherein said first vacuum means comprises:
   a. a first vacuum source responsive to said actuating means and effective for generating a vacuum pressure of said first order of magnitude,
   b. a vacuum chamber mounted within said rotatably mounted apertured belt intermediate said apertured drive pulley and said spring-loaded idler pulley, said vacuum chamber having an inlet aperture, an outlet head disposed in communicating relationship with said linear section of said belt inboard of said hopper, and an inner passageway connecting said inlet aperture to said outlet head, and c. first tubular means connecting said first vacuum source to said inlet aperture of said vacuum chamber.

14. The vacuum assisted friction feeder defined in claim 13 wherein said second vacuum means comprises:

a. a second vacuum source responsive to said actuating means and effective for generating a vacuum pressure of said second order of magnitude, b. a vacuum shoe stationarily mounted within said apertured drive pulley, said vacuum shoe having an inlet aperture and an elongated arcuate outlet head leading away from said inlet aperture and communicating with the inner circumference of said drive pulley and with said arcuate section of said belt outboard of said hopper, and c. second tubular means connecting said second vacuum source to said inlet aperture of said vacuum shoe.

15. The vacuum assisted friction feeder defined in claim 14 wherein said apertured drive pulley is comprised of:

a. an elongated hub portion by means of which said drive pulley is coupled to said actuating means, b. a web member fixed to said hub portion, c. a drum-like circumference depending from said web member and containing said equally spaced apart apertures of said drive pulley, and d. an open-ended cup-like interior defined by said drum-like circumference and centrally traversed by said elongated hub portion, said vacuum shoe of said second vacuum means being mounted for stationary positioning within said cup-like interior such that said elongated arcuate outlet head thereof is disposed in communicating relationship with said drum-like circumference containing said apertures.

16. The vacuum assisted friction feeder defined in claim 9 wherein said vacuum pressure of said second order of magnitude applied by said second vacuum means to said arcuate section of said apertured belt is greater than said vacuum pressure of said first order of magnitude applied by said first vacuum means to said linear section of said belt.

17. The vacuum assisted friction feeder defined in claim 9 wherein the feeding of documents one at a time from said hopper into said document transport guideway is assured by means of a rotatably mounted separator belt associated with said document hopper and responsive to said actuating means, said separator belt upon coincident rotation with said apertured friction feed belt serving to intercept an adjacent document to said leading document and to frictionally return said adjacent document to said document hopper simultaneously with the locking of the leading edge of said leading document against said arcuate section of said apertured friction feed belt by the application of said vacuum pressure of said second order of magnitude thereagainst.

18. A vacuum assisted friction feeder for feeding documents one at a time and at high speed from a document hopper into a document transport guideway, said feeder comprising:

a. actuating means associated with said feeder and with said hopper and transport guideway, b. an apertured friction feed belt rotatably mounted by means of an apertured drive pulley and a spring-loaded idler pulley, said friction feed belt being responsive to said actuating means and cooperably disposed relative to the leading document of a stack of documents received within said hopper, c. a biasing member disposed within said hopper and effective for contacting the trailing document of said stack of documents and for applying a nominal biasing force to said stack to thereby urge the leading document thereof into contact with said apertured friction feed belt, and d. vacuum means responsive to said actuating means and effective for applying a vacuum pressure of predetermined force to a linear section of said apertured belt disposed inboard of said hopper, to thereby pickably lock the leading document thereto, and to an arcuate section of said apertured belt disposed outboard of said hopper, to thereby lock the leading edge of a picked document thereto and to pullably advance said picked document into said document transport guideway, said vacuum means comprising:

a vacuum source responsive to said actuating means for generating said vacuum pressure of predetermined force, a vacuum chamber mounted within said rotatably mounted aperture belt and having a inlet aperture, an outlet head disposed in communicating relationship with said linear section of said belt inboard of said hopper, and an inner passageway connecting said inlet aperture to said outlet head, a vacuum shoe stationarily mounted within said apertured drive pulley and having an inlet aperture and an elongated arcuate outlet head leading away from said inlet aperture and communicating with the inner circumference of said drive pulley and with said arcuate section of said belt outboard of said hopper, and tubular means connecting said vacuum source to said inlet apertures of said vacuum chamber and said vacuum shoe.

19. The vacuum assisted friction feeder defined in claim 18 wherein said apertured drive pulley is coupled to said actuating means at a point outboard of said hopper and contiguous to the entranceway of said transport guideway, and wherein said idler pulley is rotatably mounted in spaced relationship to said drive pulley and at a point inboard of said hopper.

20. The vacuum assisted friction feeder defined in claim 19 wherein said friction feed belt and said drive pulley are provided with equally spaced apart apertures responsive to said vacuum pressure to pickably lock the leading document in said stack of documents in said hopper against said linear section of said feed belt and to pullably lock the leading edge of the picked document against said arcuate section of said feed belt.

21. The vacuum assisted friction feeder defined in claim 20 wherein said equally spaced apart apertures of said friction feed belt and said drive pulley are rectilinear in configuration.

22. The vacuum assisted friction feeder defined in claim 18 wherein said apertured drive pully is comprised of:

a. an elongated hub portion by means of which said drive pulley is coupled to said actuating means, b. a web member fixed to said hub portion, c. a drum-like circumference depending from said web member and containing said equally spaced apart apertures of said drive pulley, and d. an open-ended cup-like interior defined by said drum-like circumference and centrally traversed by said elongated hub portion, said vacuum shoe of said vacuum means being mounted for stationary positioning within said cup-like interior such that said elongated arcuate outlet head thereof is disposed in communicating relationship with said drum-like circumference containing said apertures.

* * * * *